No. 681,152. Patented Aug. 20, 1901.
E. E. THOMAS.
CONE FRICTION CLUTCH.
(Application filed Jan. 5, 1900.)

(No Model.) 2 Sheets—Sheet 1.

WITNESSES
INVENTOR
EDWIN E. THOMAS
BY Paul & Hawley
HIS ATTORNEYS

UNITED STATES PATENT OFFICE.

EDWIN E. THOMAS, OF MINNEAPOLIS, MINNESOTA, ASSIGNOR TO THE UNION IRON WORKS, OF SAME PLACE.

CONE FRICTION-CLUTCH.

SPECIFICATION forming part of Letters Patent No. 681,152, dated August 20, 1901.

Application filed January 5, 1900. Serial No. 435. (No model.)

*To all whom it may concern:*

Be it known that I, EDWIN E. THOMAS, of the city of Minneapolis, county of Hennepin, State of Minnesota, have invented certain new and useful Improvements in Cone Friction-Clutches, of which the following is a specification.

This invention relates to cone friction-clutches; and the object of the invention is to provide a self-locking shifting mechanism for pulleys and shaft-couplings of this class which will do away with all end thrust on shifting collars and slip-rings as soon as the friction-surfaces are engaged or disengaged.

Cone friction-clutches are old and well known; but heretofore they have been held in engagement by a continuous end thrust of the shifting collar, which causes them to rapidly wear out and become more or less unsatisfactory.

My invention consists in providing a slip-ring on the inner end of the hub of one of the members of the clutch, with draft-rods connected to said slip-ring and passing between the arms or through the web of the other member of the clutch and connected to suitable bell-cranks and a shifting collar.

My invention further consists in details of constructions and in combinations of parts, all as hereinafter described, and particularly pointed out in the claims.

The invention will be more readily understood by reference to the accompanying drawings, forming part of this specification, and in which—

Figure 1:
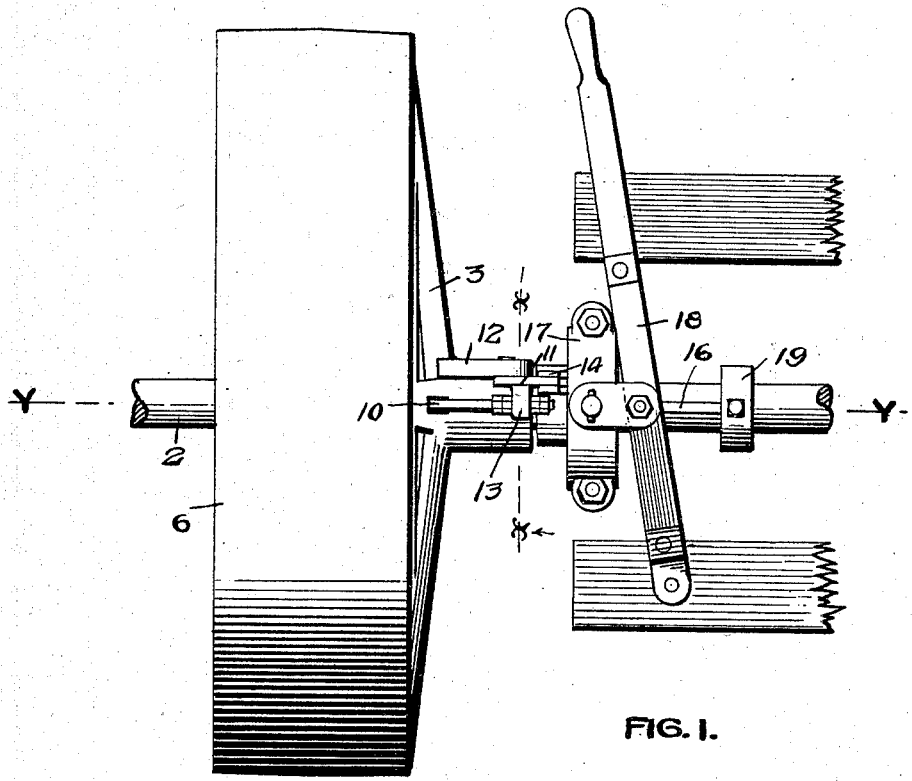
Figure 2:
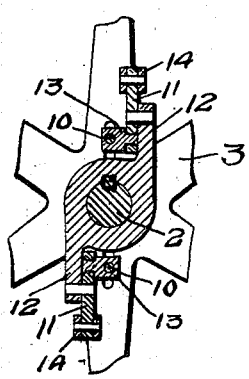
Figure 3:
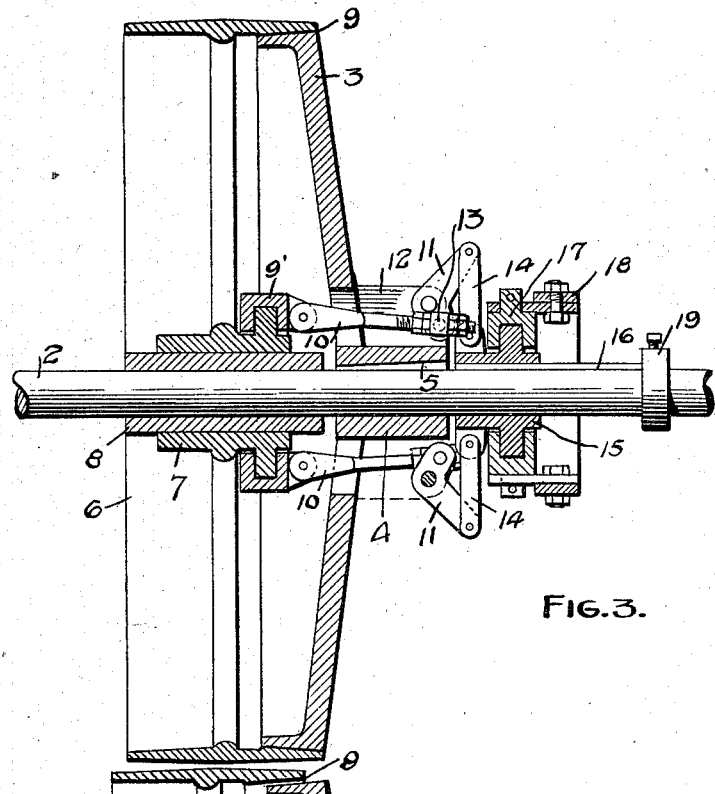
Figure 4:
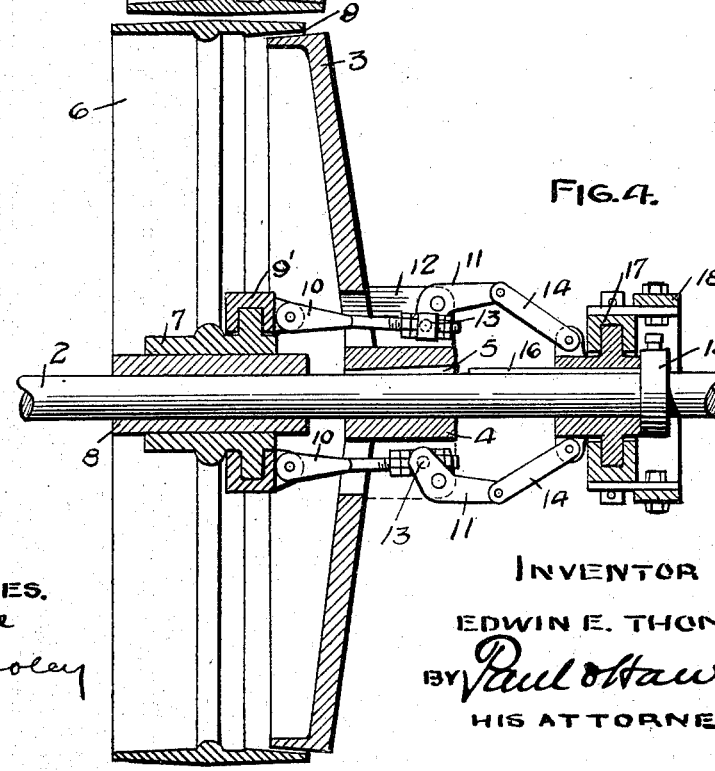

Figure 1 is an elevation of a friction cone-clutch embodying my invention. Fig. 2 is a sectional view on the line $x\ x$ of Fig. 1. Fig. 3 is a sectional view on the line $y\ y$ of Fig. 1. Fig. 4 is a similar sectional view showing the belt-pulley disengaged from the cone.

In the drawings, 2 represents the shaft, and 3 the conical-faced pulley, the hub 4 of which is secured to the shaft by a key 5 and by set-screws, if desired. The cone does not move upon the shaft. It is permanently centered thereon.

6 represents the belt-pulley, the hub 7 of which preferably contains a bearing-box 8, that runs freely upon the shaft. The pulley is provided with an internal cone-face 9, that fits the cone 3. As the cone is secured upon the shaft, it does not matter whether the pulley is exactly tight upon the shaft in the bearing, for when the pulley is drawn upon the cone it will be perfectly centered thereby. It is desirable that the means employed to force the belt-pulley upon the cone be of such character that when the belt-pulley is in either of its positions the forcing mechanism will be relieved of end thrust and friction on the thrust-bearing will be avoided, and the necessity of locking devices in connection with the shifting or operating lever will also be avoided. I accomplish this desirable result by the interposition of toggle-levers between the shifting collar and the draft-rods, which have a loose running connection with the belt-pulley.

As shown in the drawings, there is a slip-ring 9' upon the inner end of the hub of the belt-pulley. Draft-rods 10 extend from this ring to pivotal connections with the short arms of the bell-cranks 11, that are pivoted upon the wings or lugs 12, which extend from the sides of the hub of the cone. In order to draw the belt-pulley into the cone 3, it is only necessary to operate the bell-cranks 11 to draw back the short arms of the bell-cranks. The return movements of the bell-cranks accomplish the disengagement of the belt-pulley from the cone, and both movements are positive, the operation being performed without the aid of springs. The pivotal connections 13 of the draft-rods are made adjustable in order to facilitate the original adjustment of the pulleys and the taking up of wear. To operate the bell-cranks 11, I provide the links 14, pivoted upon the sliding collar or shifting collar 15, that slides upon the spines 16 on the shaft 2. This collar is operated by means of a slip-ring 17, that is held by the shifting lever 18.

19 is a fixed collar on the shaft, that forms a stop for the sliding collar 15 when retracted to separate the parts of the clutch. The end of the hub 4 forms the stop for the opposite position of the collar 15.

I prefer that the rings 9' and 17 shall be grooved, as shown, to receive the annular ring or collar upon the wheel-hub 7 and the collar 15, respectively. Suitable means may be provided for oiling these surfaces, and by making the connections as shown the oil is thrown out by centrifugal force and is held in the annular grooves instead of being thrown from the bearings, as in most devices of this class.

It will be seen that the slip-ring 9' is arranged upon the inner end of the hub 7 of the pulley 6. By the "inner" end of the hub I mean that end of the hub that is nearest the other member of the clutch. It will also be noted that as soon as the collar 15 is moved from the position shown in Fig. 4 to the position shown in Fig. 3—that is, so that the links 14 stand at right angles to the shaft 2— the toggle-levers connected to the slip-ring 9' are locked and that all end thrust upon the means for connecting the two members of the clutch is relieved. It will also be seen that the slip-ring 9' might be arranged upon the inner end of the hub of either member of the clutch.

While I have shown the clutch as applied to a cone friction-pulley, the pulley being loose upon the shaft and the cone 3 fixed to it, it will be understood that without any material change in the construction of the device the clutch might be employed for connecting together two members of a shaft-coupling, in which case one member will be secured upon each section of the shaft and the two sections will be locked together by the engagement of the two members of the clutch.

The details of the construction may be varied without departing from my invention.

Having thus described my invention, I claim as new and desire to secure by Letters Patent—

1. The combination, with a shaft, of a conical-faced pulley having a hub 4 secured on said shaft, wings or lugs 12 provided on said hub, a belt-pulley 6 having an internal coneface to fit said conical-faced pulley and a hub 7 to slide freely on said shaft, a slip-ring provided on said hub 7, bell-cranks 11 pivotally mounted on said wings, draft-rods 10 pivotally connecting the short arms of said bell-cranks with said slip-ring, a shifting collar 15 slidably arranged on said shaft, and links 14 pivotally connecting said collar 15 and the long arms of said bell-cranks, substantially as described.

2. The combination, with a shaft, of a conical-faced pulley having a hub 4 secured on said shaft, wings or lugs 12 provided on said hub, a belt-pulley having an internal coneface to fit said conical-faced pulley and a hub 7 to slide freely on said shaft, a slip-ring provided on said hub 7, bell-cranks 11 pivotally mounted on said wings, draft-rods 10 pivotally connected to said slip-ring and adjustably connected to the short arms of said bell-cranks, a shifting collar 15 slidably arranged on said shaft, links 14 pivotally connecting said collar 15 and the long arms of said bell-cranks, a second slip-ring provided on said collar 15 and an operating-lever 18 connected with said second slip-ring, substantially as described.

In testimony whereof I have hereunto set my hand, this 2d day of January, 1900, at Minneapolis, Minnesota.

EDWIN E. THOMAS.

Witnesses:
A. C. PAUL,
M. C. NOONAN.